(12) United States Patent
Lu et al.

(10) Patent No.: US 7,492,767 B2
(45) Date of Patent: Feb. 17, 2009

(54) METHODS, SYSTEMS, AND COMPUTER PROGRAM PRODUCTS FOR THROTTLING NETWORK ADDRESS TRANSLATION (NAT) LEARNING TRAFFIC IN A VOICE OVER IP DEVICE

(75) Inventors: David Z. Lu, Dallas, TX (US); San-Qi Li, Plano, TX (US); Yen Shei, Plano, TX (US)

(73) Assignee: Santera Systems, Inc., Plano, TX (US)

( * ) Notice: Subject to any disclaimer, the term of this patent is extended or adjusted under 35 U.S.C. 154(b) by 204 days.

(21) Appl. No.: 11/495,990

(22) Filed: Jul. 28, 2006

(65) Prior Publication Data

US 2006/0288114 A1 Dec. 21, 2006

Related U.S. Application Data

(63) Continuation-in-part of application No. 10/676,240, filed on Oct. 1, 2003.

(51) Int. Cl.
 *H04L 12/28* (2006.01)
(52) U.S. Cl. ....................... 370/389; 370/392
(58) Field of Classification Search ........................ None
 See application file for complete search history.

(56) References Cited

U.S. PATENT DOCUMENTS

| 6,434,627 | B1 * | 8/2002 | Millet et al. ................ 709/245 |
| 6,629,137 | B1 * | 9/2003 | Wynn ........................ 709/223 |
| 6,674,758 | B2 | 1/2004 | Watson |
| 2005/0068942 | A1 * | 3/2005 | Chu et al. ................... 370/352 |
| 2005/0076108 | A1 | 4/2005 | Li et al. |
| 2005/0259637 | A1 * | 11/2005 | Chu et al. ................... 370/352 |
| 2006/0268845 | A1 * | 11/2006 | He et al. .................... 370/352 |

* cited by examiner

*Primary Examiner*—Phirin Sam
(74) *Attorney, Agent, or Firm*—Jenkins, Wilson, Taylor & Hunt, P.A.

(57) ABSTRACT

Methods, systems, and computer program products for throttling network address translation (NAT) learning traffic in a voice over IP device are disclosed. According to one method, a plurality of media packets associated with a media session are received at a voice over IP device. A NAT learning throttling filter is applied to select the subset of the packets to be used for NAT learning and thereby limit the number of received media packets to be used for NAT learning. NAT learning is performed for the session using the packets selected by the NAT learning throttling filter.

38 Claims, 6 Drawing Sheets

US 7,492,767 B2

METHODS, SYSTEMS, AND COMPUTER PROGRAM PRODUCTS FOR THROTTLING NETWORK ADDRESS TRANSLATION (NAT) LEARNING TRAFFIC IN A VOICE OVER IP DEVICE

RELATED APPLICATIONS

This application is a continuation-in-part of U.S. patent application Ser. No. 10/676,240, filed Oct. 1, 2003, the disclosure of which is incorporated herein by reference in its entirety.

TECHNICAL FIELD

The subject matter described herein relates to controlling NAT learning in a media gateway. More particularly, the subject matter described herein relates to methods, systems, and computer program products for throttling network address translation (NAT) learning traffic in a voice over IP device.

BACKGROUND ART

In modern telecommunications networks, media gateways are used to connect telephone calls (also known as sessions) between various types of communications terminals. These communications terminals may be packet-based communications terminals or traditional TDM communications terminals. Media gateways perform media format translation functions so that the media streams delivered to the various types of communications terminals are in the proper formats.

Media gateways are controlled by network entities referred to as media gateway controllers (MGC), commonly referred to as soft switches. Soft switches perform call signaling functions to establish sessions between communications terminals via one or more media gateways. Soft switches communicate with media gateways via one or more gateway control protocols, such as MEGACO or MGCP.

Network address translators or NATs translate the source IP addresses in a packet from one IP address space to another. Network address translation may also include translating the source ports (e.g., UDP and TCP ports) in outgoing IP packets. Exemplary proposals for network address translation appear in IETF RFC 2263 and RFC 3022, the disclosure of each of which is incorporated herein by reference in its entirety.

One problem with using network address translation in a voice-over-IP communications network is that there may be no way to know in advance what IP address and UDP ports will appear in the source address fields of the media packets in a voice-over-IP media stream. The private source IP address for a session involving a media gateway may be contained in call setup messages for the session. However, the private, untranslated IP address is only useful in the sending service provider's network. Only the final source IP and UDP addresses (statically or dynamically) translated by the customer-premises NATs at run time are meaningful to the destination media gateway. Because the final NAT-translated address cannot be determined before the media packets actually pass through the customer-premises NAT, NAT learning must be preformed so that the receiving media gateway will know the proper destination address to include in outgoing media packets for the session.

Some voice-over-IP systems use a central processing unit (CPU) to perform NAT learning. For example, packets may be forwarded to the CPU, which examines incoming data traffic's source IP addresses and UDP ports in order to establish a pattern and thus determine where future packets for the same media session should be routed. Once the CPU learns the source IP address and UDP port for the session, the CPU communicates this information to the voice server assigned to the session so that outgoing packets for the session can be correctly addressed.

In one NAT learning implementation, each successively received packet in a stream of packets for a session that is in NAT learning mode is examined by one or more CPUs for NAT learning purposes until the source addresses are learned. One problem with examining each packet for a session until the source addresses are learned is that it increases the processing burden on the CPU and prevents the CPU from performing other tasks. In light of the line rates in many packet based networks, performing NAT learning for every received packet of a session until the source IP address and UDP port are learned can consume a significant amount of resources on the learning device.

Accordingly, in light of these difficulties, there exists a need for improved methods, systems, and computer program products for throttling NAT learning traffic in a voice over IP device.

SUMMARY

Methods, systems, and computer program products for throttling network address translation (NAT) learning traffic in a voice over IP device are disclosed. According to one method, a plurality of media packets associated with a media session are received at a voice over IP device. A NAT learning throttling filter is applied to select the subset of the packets to be used for NAT learning and thereby limit the number of received media packets to be used for NAT learning. NAT learning is performed for the session using the packets selected by the NAT learning throttling filter.

As used herein, the term "voice over IP device" refers to any device that handles voice over IP media sessions. Examples of voice over IP devices in which the subject matter described herein may be implemented include media gateways, session border controllers, and IP routers that are associated with voice over IP media sessions.

The subject matter described herein for throttling NAT learning traffic in a voice over IP device may be implemented using a computer readable medium having stored thereon computer executable instructions that when executed by the processor of a computer perform steps of the aforementioned method. Exemplary computer readable media suitable for implementing the subject matter described herein include disk memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings of which.

DETAILED DESCRIPTION OF THE INVENTION

Figure 1:
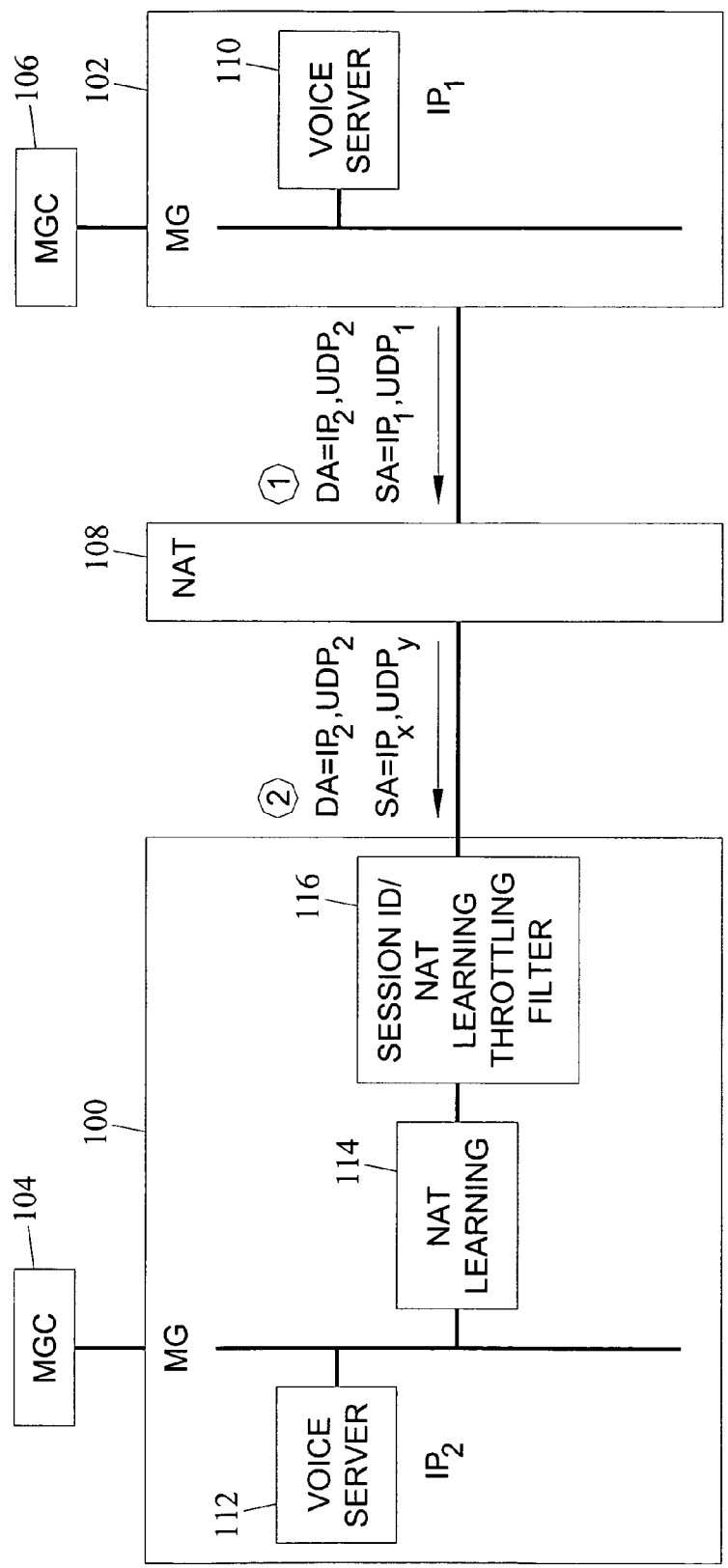
FIG. 1 is a block diagram of a network including a system for throttling NAT learning traffic in a voice over IP device according to an embodiment of the subject matter described herein.

Methods, systems, and computer program products for throttling NAT learning traffic in a-voice over IP device are disclosed. In one implementation, a voice over IP device may be a media gateway that establishes media sessions with another media gateway. FIG. 1 is a block diagram of a network including a media gateway having a system for throttling NAT learning traffic according to embodiment of the subject matter described herein. Referring to FIG. 1, media gateways 100 and 102 are respectively controlled by media gateway controllers 104 and 106. A network address translator 108 resides in front of media gateway 102 to translate source network and transport addresses of outgoing media packets from media gateway 102.

In the illustrated example, media gateway 102 includes a voice server 110 with IP address $IP_1$. Similarly, media gateway 100 includes a voice server 112 with IP address $IP_2$. Media gateway 100 also includes a NAT learning function 114 for learning the source IP address and UDP port in packets received from media gateway 102 and a session identifier/NAT learning throttling filter 116 for throttling NAT learning traffic.

In the illustrated example, media gateway 102 sends a packet with a destination address $IP_2$, $UDP_2$ and source address $IP_1$, $UDP_1$ to media gateway 100. Network address translator 108 translates the source addresses in the packet so that the source addresses in the packet are $IP_X$, $UDP_Y$, representing the NAT-translated addresses. Media gateway 100 must learn the address $IP_X$, $UDP_Y$ to be able to send outgoing media packets for the session to media gateway 102. In prior implementations, if a session was in NAT learning mode, all media packets for the session were forwarded to the NAT learning function until the address was learned. However, according to the subject matter described herein, session identifier/NAT learning throttling filter 116 may throttle NAT learning packets such that only selected NAT learning packets are used for NAT learning. As a result, the processing burden on the resource within media gateway 100 that implements NAT learning function 114 is conserved.

Figure 2:
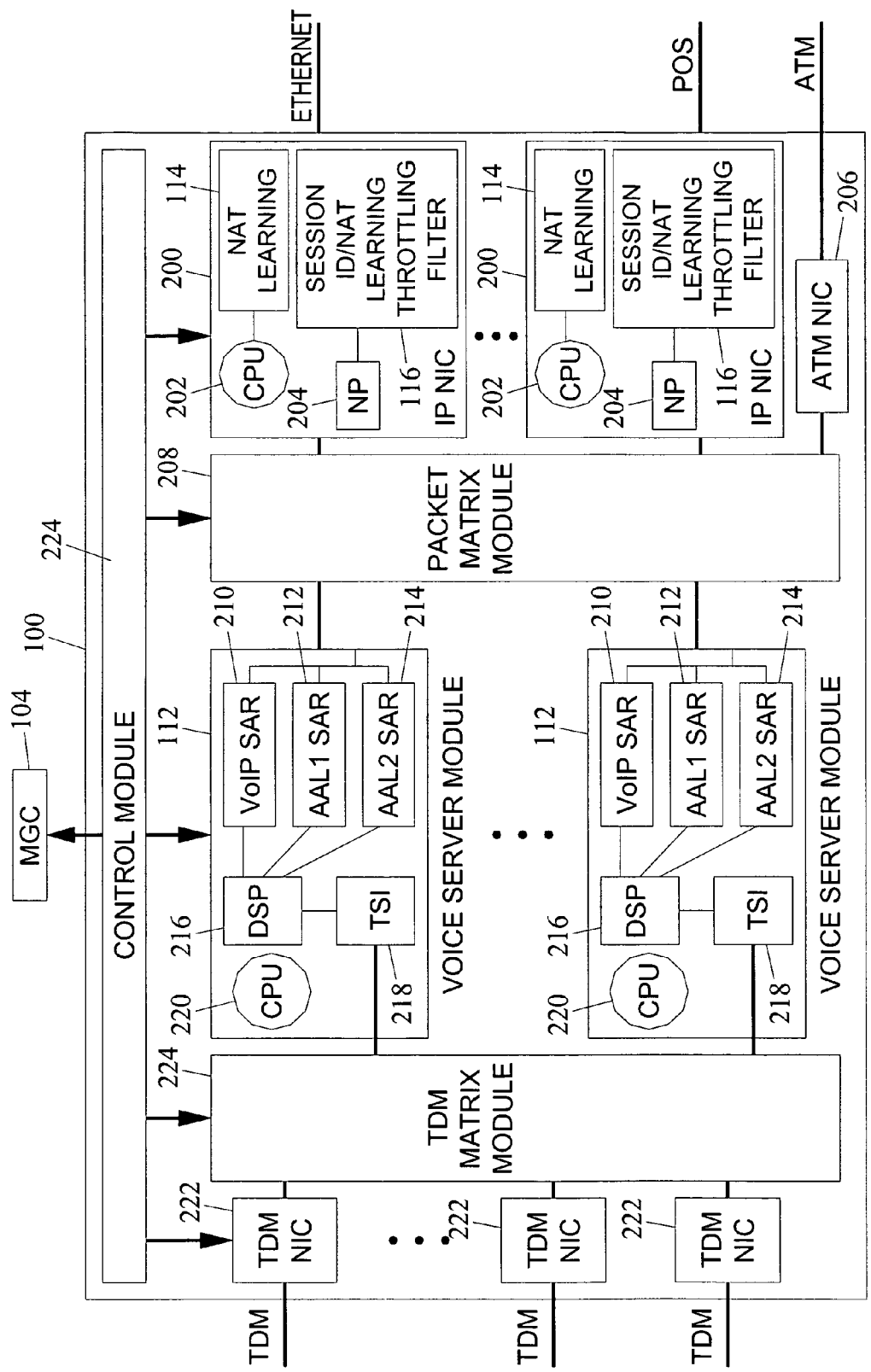
FIG. 2 is a block diagram of a voice over IP device for including a system for throttling NAT learning traffic according to an embodiment of the subject matter described herein.

FIG. 2 is a block diagram illustrating an exemplary internal architecture for media gateway 100 in more detail. Referring to FIG. 2, media gateway 100 includes a plurality of IP network interfaces 200 for sending and receiving packets associated with media sessions. Each IP network interface 200 includes a central processing unit 202 and a network processor 204. In the illustrated example, central processing unit 202 implements NAT learning function 114. Network processor 204 implements session identifier/NAT learning throttling function 116.

Media gateway 100 further includes an ATM network interface 206 for sending and receiving media packets over ATM based sessions. A packet matrix module 208 switches packets between network interfaces 200 and 206 and voice server modules 112. Packet matrix module 208 may any suitable matrix for switching packets between resources within media gateway 100. In one implementation, packet matrix module 208 is an Ethernet-based matrix. In an alternate implementation, packet matrix module 208 may be an ATM-based switching matrix.

Each voice server 112 may include media processing resources for processing each media session. In the illustrated example, these resources include voice over IP and ATM segmentation and reassembly (SAR) functions 210, 212, and 214 for performing segmentation and reassembly functions for media packets. Each voice server module 112 may also include a digital signal processor (DSP) 216 for performing functions, such as transcoding, for voice over IP sessions. A time slot interconnect (TSI) 218 connects TDM channels processed by media gateway 100. Each voice over may also include a CPU 220 which controls the overall operation of each voice over.

Media gateway 100 may also include a plurality of TDM network interface cards sending and receiving voice and other media over a TDM-based network, such as the PSTN. A TDM matrix module 224 may communicate data over TDM based channels to and from voice server modules 112.

A control module 224 may control the overall operation of media gateway 100. Control module 224 may also communicate with media gateway controller 104 to establish and tear down connections.

Although in the illustrated example, NAT learning is implemented by CPUs 202 located on network interfaces 200, the subject matter described herein is not limited to this implementation. In an alternate implementation, NAT learning may be implemented by CPUs 220 located on voice server modules 112, DSPs 216 located on voice server modules 212, or on a centralized CPU associated with control module 224.

Figure 3:
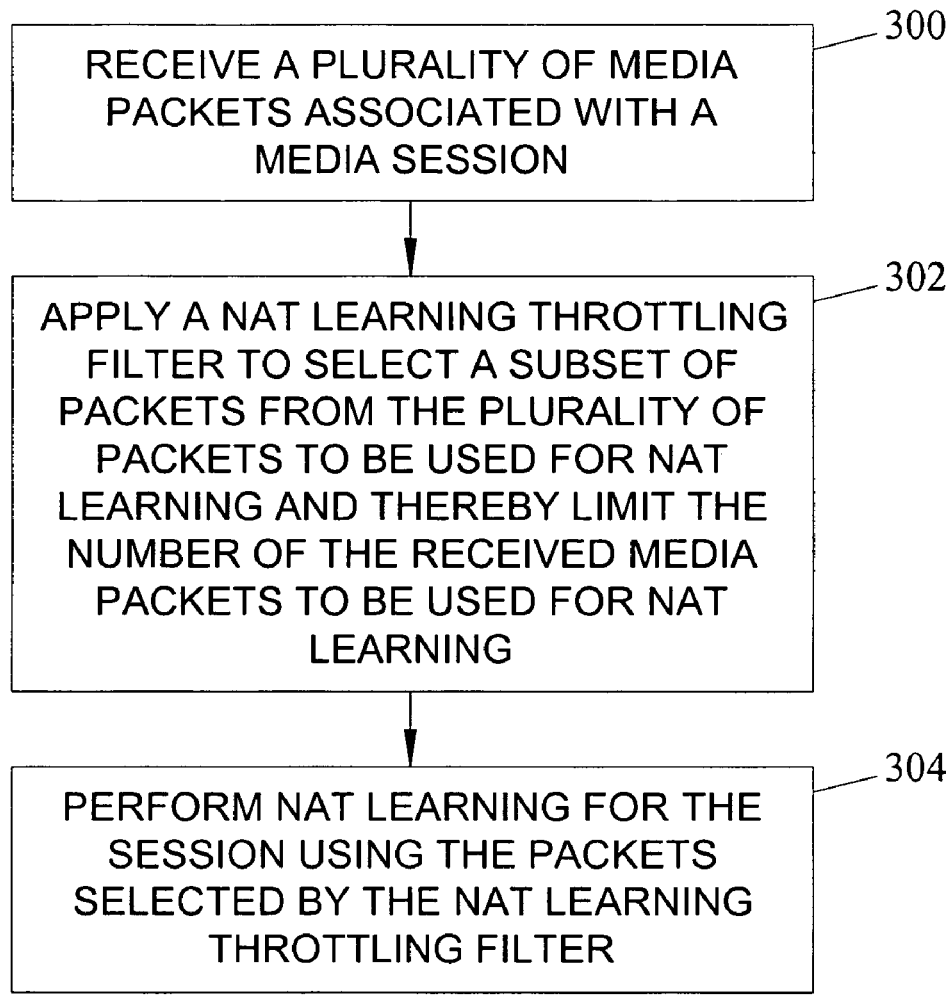
FIG. 3 is a flow chart illustrating exemplary overall steps for throttling NAT learning traffic in voice over IP device according to an embodiment of the subject matter described herein.

FIG. 3 is a flow chart illustrating exemplary overall steps for throttling NAT learning traffic in a media gateway according to an embodiment of the subject matter described herein. Referring to FIG. 3, in step 300, a plurality of media packets associated with the media session is received. For example, the media packets may be received at session identifier/NAT learning throttling function 116 illustrated in FIG. 2. In step 302 a NAT learning throttling filter is applied to the packets to select the subset of the packets to be used for NAT learning and thereby to limit the number of received media packets used for NAT learning. Step 302 may be performed by session identifier/NAT learning throttling function 116 illustrated in FIG. 2.

In step 304, NAT learning is performed for the session using the packets selected by the NAT learning throttling filter.

Figure 4:
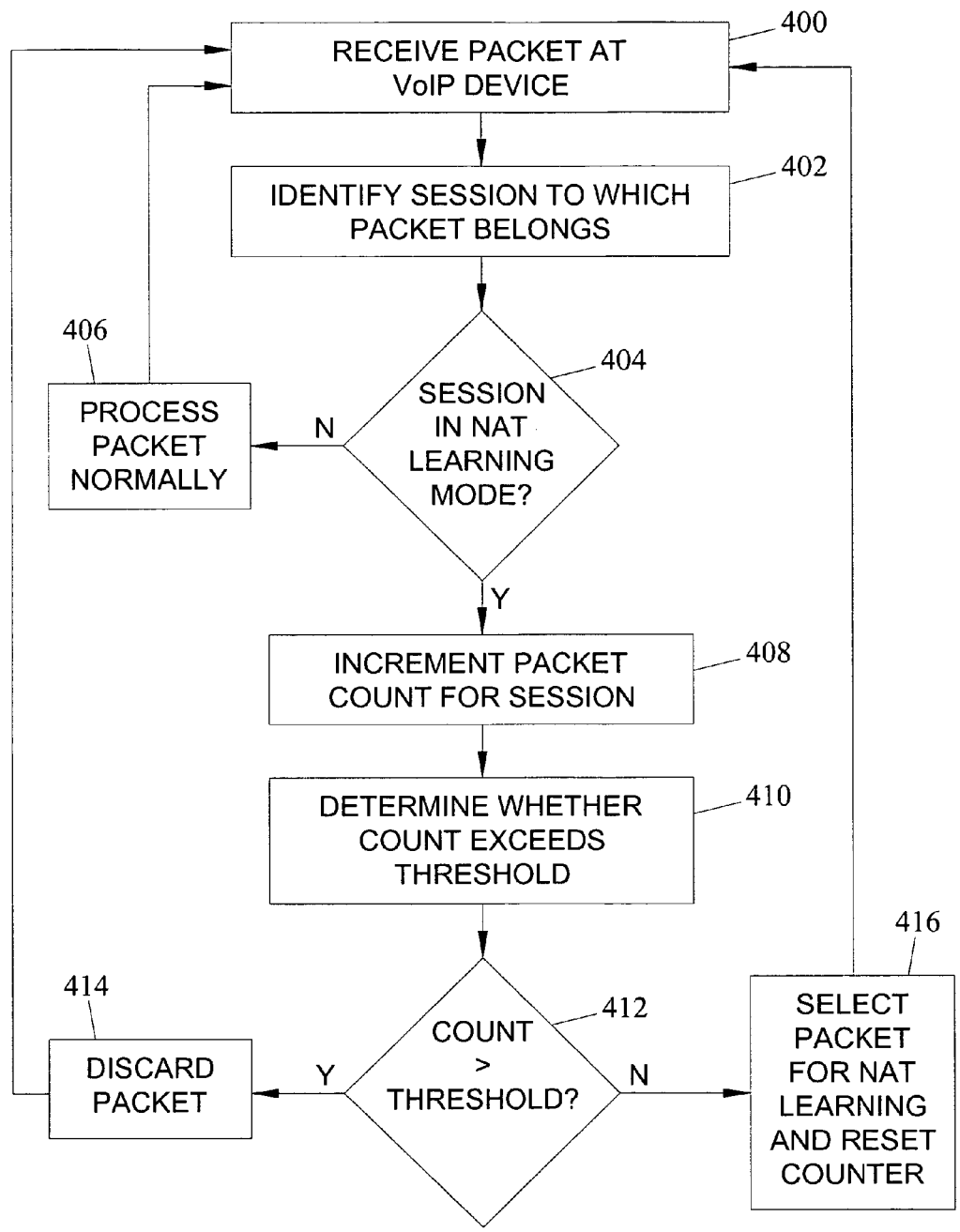
FIG. 4 is a flow chart illustrating exemplary steps of one method for throttling NAT learning traffic in a voice over IP device according to an embodiment of the subject matter described herein.

In one exemplary implementation of the NAT learning throttling filter, per session counters may be maintained to count the number of packets for each session. When a packet count-for a given session exceeds a threshold number of packets, remaining packets are disqualified from NAT learning. FIG. 4 is a flow chart illustrating exemplary steps for throttling NAT learning traffic in a media gateway using per session counters to select a threshold number of packets for NAT learning.

Referring to FIG. 4, in step 400, a packet is received at a voice over IP device. In step 402, the session to which the packet belongs is identified. For voice over IP sessions received at a media gateway, the session may be identified using the destination IP address and UDP port. The destination IP address and UDP port associated with a session may be allocated in advance by signaling between the media gateway controllers. The IP address and UDP port may be associated with a voice processing resource, such as one of voice servers 112 in a media gateway. In step 404, it is determined whether the session is in NAT learning mode. A session may initially be in NAT learning mode before the source IP address and source UDP port for the session are known. After this occurs, the session may be taken out of NAT learning mode. In step 404, if the session is determined not to be in NAT learning mode, control proceeds to step 406 where the packet is processed as normal. Processing the packet as normal may include forwarding the packet to the appropriate voice processing resource for further processing. Control may then return to step 400 to process the next packet.

In step 404, if the session is in NAT learning mode, control proceeds to step 408 where a packet count for the session is incremented. In steps 410 and 412, it is determined whether the packet count exceeds a threshold. If the count exceeds the threshold, control proceeds to step 414 where the packet is discarded. If the count does not exceed the threshold, control proceeds to step 416 where the packet is selected for NAT learning. Control then returns to step 400 where the next received packet is processed.

In alternate implementation of the subject matter described herein, rather than performing NAT learning for the first N packets where N equals the threshold number of packets, it may be desirable to perform NAT learning for every Nth packet of a session, such that every 1/N packets is selected for NAT learning and every (N−1)/N packets are discarded.

Figure 5:
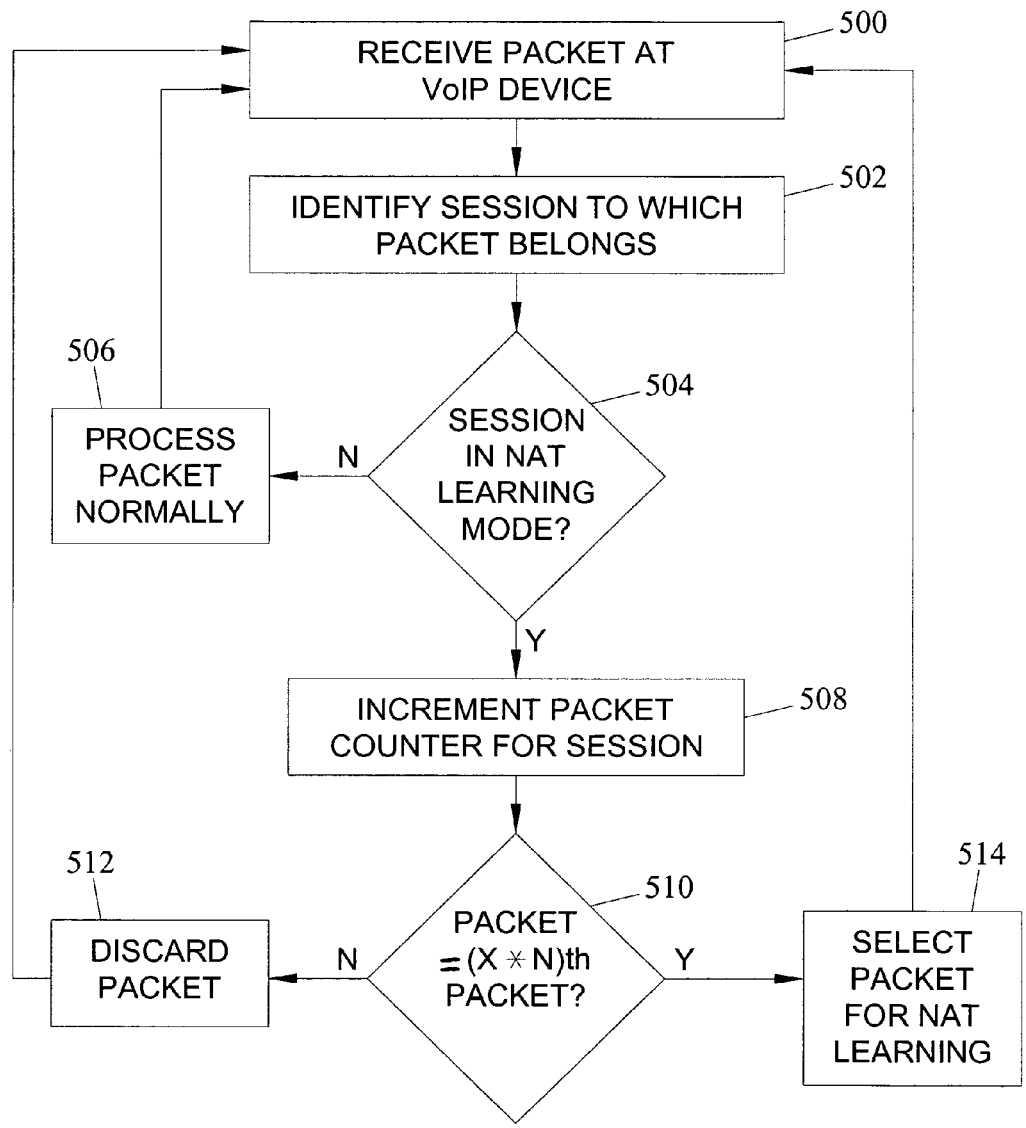
FIG. 5 is a flow chart illustrating exemplary steps of an alternate method for throttling NAT learning traffic in a voice over IP device according to an embodiment of the subject matter described herein.

FIG. 5 is a flow chart illustrating exemplary steps for throttling NAT learning traffic in a voice over IP device using this method. Referring to FIG. 5, in step 500, a packet is received at a voice over IP device. In step 502, the session to which the packet belongs is identified. In step 504, it is determined whether the session is in a NAT learning mode. If the session is not in NAT learning mode, control proceeds to step 506 where the packet is processed normally. Control then returns to strep 500 where the next received packet is processed.

In step 504, if it is determined that the session is in NAT learning mode, control proceeds to step 508 where the packet counter for the session is incremented. In step 510, it is determined whether the packet is an (x*N)th packet for the session, where N is an integer greater than 0 and x is an integer greater than zero that increases after a packet is selected for NAT learning. For example, if x starts at one and increases by one after a packet is selected for NAT learning, the Nth, the 2Nth, the 3Nth, etc., packet will be selected for NAT learning. If the packet is not the (x*N)th packet, control proceeds to step 512 where the packet is discarded. If the packet is the Nth packet, control proceeds to step 514 where the packet is selected from NAT learning. Control then returns to step 500 where the next packet is received.

In the examples illustrated in FIGS. 4 and 5, NAT learning is throttled using per session packet counters. In order to avoid using per session packet counters, sequence number in received packet can be analyzed to determine the number of packets that have been received for a session. Using the sequence number and an algorithm that determines the number of packets that have been received, it is not necessary to implement per packet counters.

Figure 6:
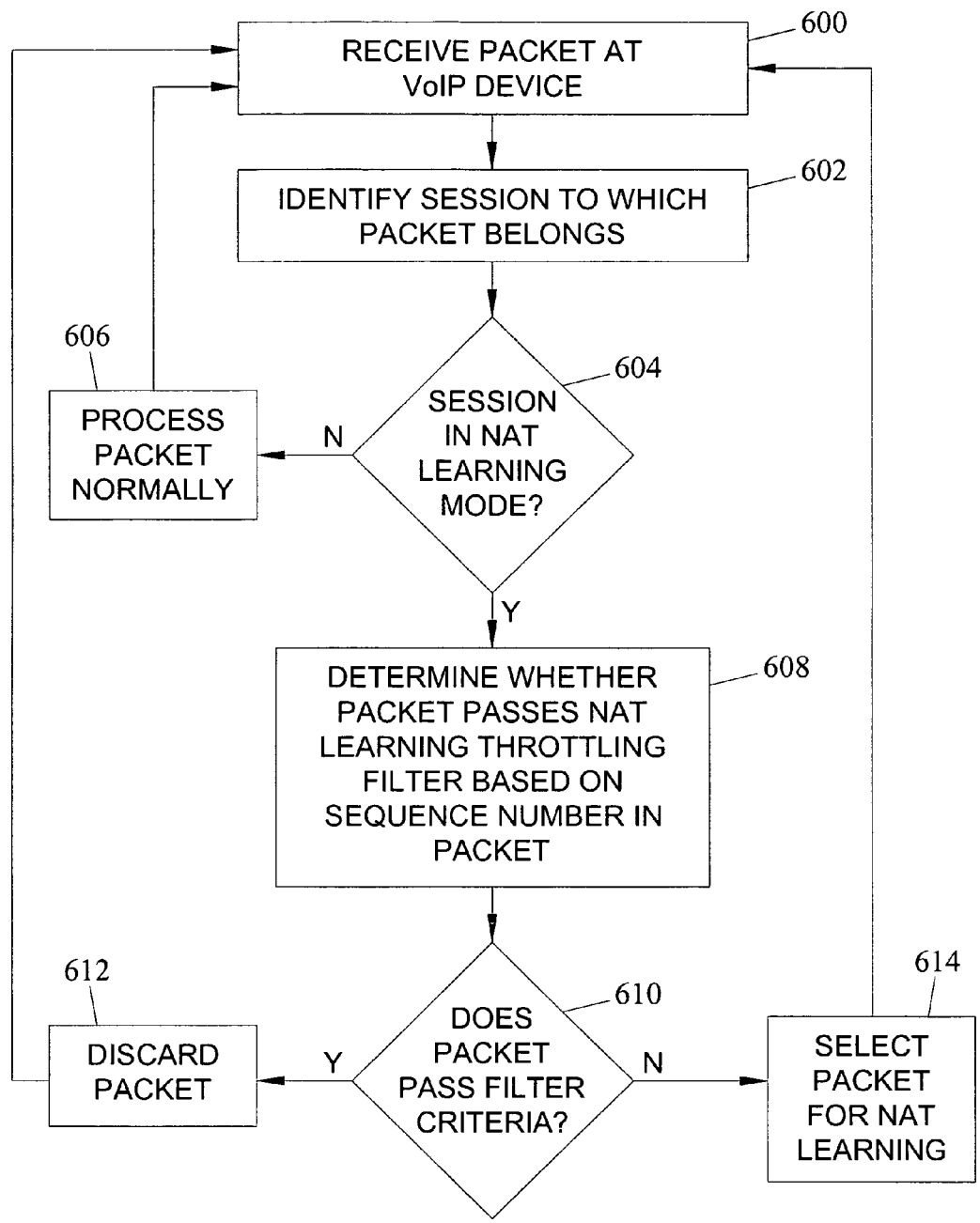
FIG. 6 is a flow chart illustrating exemplary steps of another alternate method for throttling NAT learning traffic in a voice over IP device according to an embodiment of the subject matter described herein.

FIG. 6 is a flow chart illustrating exemplary steps for throttling NAT learning traffic at a voice over IP device using sequence number analysis according to an embodiment of the subject matter described therein. Referring to FIG. 6, in step 600, a packet is received at a voice over IP device. In step 602, the session to which a packet belongs is determined. In step 604, it is determined whether the session in NAT learning mode. If the session is not in NAT learning mode, control proceeds to step 606 where the packet is processed normally. Control may then return to step 600 where the next received packet is processed.

In step 604, it is determined that the packet session is in NAT learning mode, control proceeds to steps 608 and 610 where it is determined whether the packet passes the NAT learning throttling filter based on a sequence number in the packet. In one implementation, the real-time transport protocol (RTP) header sequence number may be used. Although the initial RTP sequence number for a session may not be known, the RTP sequence number in the RTP header of the packet may be analyzed. For example, a modular operation can be applied to the RTP sequence number so that every Nth packet of the same RTP session may be identified. For example, if ((RTP_Seq_no)modN)==0, then the packet may be selected for NAT learning. if(RTP_Seq_No)modN)<>0), then the packet may excluded from NAT learning.

In step 610, if it is determined whether the packet passes the filter criteria, control proceeds to step 612 where the packet is discarded. Control may then return to step 600 where the next received packet is processed.

In step 610, If the packet passes the filter criteria, control proceeds to step 614 where the packet is selected for NAT learning. Control then returns to step 600 where the next packet is received and processed.

It will be understood that various details of the invention may be changed without departing from the scope of the invention. Furthermore, the foregoing description is for the purpose of illustration only, and not for the purpose of limitation.

What is claimed is:

1. A method for throttling network address translation (NAT) learning traffic in a voice over IP device, the method comprising:
   in a voice over IP device:
   (a) receiving a plurality of media packets associated with a media session for which NAT learning is required;
   (b) applying a NAT learning throttling filter to limit the number of packets to be used for NAT learning by selecting a subset of packets from the plurality of received media packets for the session; and
   (c) performing NAT learning for the session using the packets selected by the NAT learning throttling filter.

2. The method of claim 1 wherein the voice over IP device comprises a media gateway.

3. The method of claim 1 wherein the voice over IP device comprises a device selected from the group consisting of session border controller and an IP router.

4. A method for throttling network address translation (NAT) learning traffic in a voice over IP device, the method comprising:
   in a voice over IP device:
   (a) receiving a plurality of media packets associated with a media session for which NAT learning is required;
   (b) applying a NAT learning throttling filter to limit the number of packets to be used for NAT learning by selecting a subset of packets from the plurality of received media packets for the session, wherein applying a NAT learning throttling filter includes, for each received packet:
      (i) identifying a session to which the packet belongs;
      (ii) incrementing a packet count for the session;
      (iii) determining whether the packet count for the session exceeds a threshold;

(iv) in response to determining that the packet count exceeds the threshold, preventing the packet from being used for NAT learning; and (v) in response to determining that the packet count does not exceed the threshold, selecting the packet for NAT learning; and (c) performing NAT learning for the session using the packets selected by the NAT learning throttling filter.

5. The method of claim 4 wherein applying a NAT learning throttling filter includes for each received N packets, N being an integer, selecting 1/N of the received packets for NAT learning and preventing the remaining (N−1)/N packets from being used for NAT learning.

6. The method of claim 4 wherein applying a NAT learning throttling filter comprises, for each received packet:

(a) performing a modular operation based on a sequence number in the packet; and (b) determining whether to use the packet for NAT learning based on a result of the modular operation.

7. The method of claim 6 wherein the sequence number comprises a sequence number located in the real-time transport protocol (RTP) header of the packet.

8. The method of claim 6 wherein performing a modular operation on the packet includes computing (sequence number mod N), where N is an integer greater than zero, and wherein determining whether to use the packet for NAT learning includes determining whether to use the packet based on a result of the computation.

9. The method of claim 8 wherein selecting the packet for NAT learning includes selecting the packet if the result is zero.

10. The method of claim 6 wherein determining whether to use the packet for NAT learning includes determining whether the received packet is an (x*N)th packet for the session, where N is and integer greater than zero and x is an integer greater than zero and that increases after a packet is selected for NAT learning, in response to determining that the packet is the (x*N)th packet, selecting the packet for NAT learning, and, in response to determining that the packet is not the (x*N)th packet, preventing the packet from being used for NAT learning.

11. The method of claim 1 wherein performing NAT learning includes learning a source IP address and a source UDP port for the session.

12. The method of claim 1 wherein performing NAT learning includes performing NAT learning using at least one of a network processor located on a packet interface card, a central processing unit located on the packet interface card, a centralized control module associated with the voice over IP device, and a digital signal processor associated with a voice processing resource in the voice over IP device.

13. The method of claim 1 wherein the session comprises at least one of a voice over IP call and a multimedia session.

14. A system for throttling network address translation (NAT) learning traffic, the system comprising:

in a voice over IP device:

(a) a session identifier/NAT learning throttling filter for receiving a plurality of packets associated with a media session, for applying a NAT learning filter function to select a subset of packets from the plurality of packets to be used for NAT learning and thereby limit the number of received media packets to be used for NAT learning; and (b) a NAT learning function for performing NAT learning for the session using the media packets selected by the session identifier/NAT learning throttling filter.

15. The system of claim 14 wherein the voice over IP device comprises a media gateway.

16. The system of claim 14 wherein the voice over IP device comprises a device selected from the group consisting of a session border controller and an IP router.

17. A system for throttling network address translation (NAT) learning traffic, the system comprising:

in a voice over IP device:

(a) a session identifier/NAT learning throttling filter for receiving a plurality of packets associated with a media session, for applying a NAT learning filter function to select a subset of packets from the plurality of packets to be used for NAT learning and thereby limit the number of received media packets to be used for NAT learning, wherein the session identifier/NAT learning throttling filter is adapted to, for each received packet:

(i) identify a session to which the packet belongs;

(ii) increment a packet count for the session;

(iii) determine whether the packet count exceeds a threshold;

(iv) in response to determining that the packet count exceeds the threshold, prevent the packet from being used for NAT learning; and (v) in response to determining that the packet count does not exceed the threshold, select the packet for NAT learning; and (b) a NAT learning function for performing NAT learning for the session using the media packets selected by the session identifier/NAT learning throttling filter.

18. The system of claim 17 wherein the session identifier/NAT learning throttling filter is adapted to, for each N packets received for the session, N being an integer, select 1/N of the packets for NAT learning and prevent (N−1)/N of the packets from being used for NAT learning.

19. The system of claim 17 wherein the session identifier/NAT learning throttling filter is adapted to, for each received packet for the session:

(a) perform a modular operation based on a sequence number in the packet; and (b) determine whether to use the packet for NAT learning based on at a result of the modular operation.

20. The system of claim 19 wherein the sequence number comprises a sequence number in the real-time transport protocol (RTP) header of the packet.

21. The system of claim 19 wherein the session identifier/NAT learning throttling filter is adapted to compute (sequence number mod N), where N is an integer greater than zero and to determine whether to use the packet for NAT learning based on a result of the computation.

22. The system of claim 21 wherein the session identifier/NAT learning throttling filter is adapted to select the packet for NAT learning in response to determining that the result is zero.

23. The system of claim 19 wherein the session identifier/NAT learning throttling filter is adapted to determine whether the received packet comprises an (x*N)th packet for the session, where N is an integer greater than zero and x is an integer greater than zero and that increases after a packet is selected for NAT learning, to select the received packet for NAT learning in response to determining that the received packet comprises the (x*N)th packet, and to prevent the packet from being used for NAT learning in response to determining that the received packet is not the(x*N)th packet for the session.

24. The system of claim 14 wherein the NAT learning function is adapted to learn a source IP address and a source UDP port for the session.

25. The system of claim 14 wherein the NAT learning function is implemented by at least one of a central processing unit associated with a network interface, a control module, and a digital signal processor associated with the voice over IP device.

26. The system of claim 14 wherein the session comprises at least one other voice over IP call and a multimedia session.

27. A computer readable medium having stored thereon computer executable instructions that when executed by the processor of a computer perform steps comprising:
in a voice over IP device:
(a) receiving a plurality of media packets associated with a media session for which network address translation (NAT) learning is required;
(b) applying a NAT learning throttling filter to limit the number of packets to be used for NAT learning by selecting a subset of packets from the plurality of received media packets for the session to be used for NAT learning; and
(c) performing NAT learning for the session using the packets selected by the NAT learning throttling filter.

28. The computer readable medium of claim 27 wherein the voice over IP device comprises a media gateway.

29. The computer readable medium of claim 27 wherein the voice over IP device comprises a device selected from the group consisting of session border controller and an IP router.

30. A computer readable medium having stored thereon computer executable instructions that when executed by the processor of a computer perform steps comprising:
in a voice over IP device:
(a) receiving a plurality of media packets associated with a media session for which network address translation (NAT) learning is required;
(b) applying a NAT learning throttling filter to limit the number of packets to be used for NAT learning by selecting a subset of packets from the plurality of received media packets for the session to be used for NAT learning, wherein applying a NAT learning throttling filter includes, for each received packet:
(i) identifying a session to which the packet belongs;
(ii) incrementing a packet count for the session;
(iii) determining the packet count for the session exceeds a threshold;
(vi) in response to determining that the packet count exceeds the threshold, preventing the packet from being used for NAT learning; and
(v) in response to determining that the packet count does not exceed the threshold, selecting the packet for NAT learning; and
(c) performing NAT learning for the session using the packets selected by the NAT learning throttling filter.

31. The computer readable medium of claim 30 wherein applying a NAT learning throttling filter includes for each received N packets, N being an integer, selecting 1/N of the received packets for NAT learning and preventing the remaining (N−1)/N packets from being used for NAT learning.

32. The computer readable medium of claim 30 wherein applying a NAT learning throttling filter comprises, for each received packet:
(a) performing a modular operation based on a sequence number in the packet; and
(b) determining whether to use the packet for NAT learning based on a result of the modular operation.

33. The computer readable medium of claim 32 wherein performing a modular operation for the packet includes computing (sequence number mod N), where N is an integer, and wherein determining whether to use the packet for NAT learning includes determining whether to use the packet for NAT learning based on a result of the computation.

34. The computer readable medium of claim 33 wherein determining whether to use the packet for NAT learning includes determining to use the packet for NAT learning in response to the result being zero.

35. The computer readable medium of claim 32 wherein determining whether to use the packet for NAT learning includes determining whether the received packet is an (x*N)th packet for the session, N being an integer greater than zero and x being an integer greater than zero that increases after a packet is selected for NAT learning, in response to determining that the packet is the (x*N)th packet, selecting the packet for NAT learning, and, in response to determining that the packet is not the (x*N)th packet, preventing the packet from being used for NAT learning.

36. The computer readable medium of claim 27 wherein performing NAT learning includes learning a source IP address and a source UDP port for the session.

37. The computer readable medium of claim 27 wherein performing NAT learning includes performing NAT learning using at least one of a network processor located on a packet interface card, a central processing unit located on the packet interface card, a centralized control module associated with the voice over IP device, and a digital signal processor associated with a voice processing resource in the voice over IP device.

38. The computer readable medium of claim 27 wherein the session comprises at least one of a voice over IP call and a multimedia session.

* * * * *